Feb. 13, 1951      O. R. HENNINGS      2,541,964
FLEXIBLE SLIDE FORK
Filed Dec. 22, 1947      2 Sheets-Sheet 1
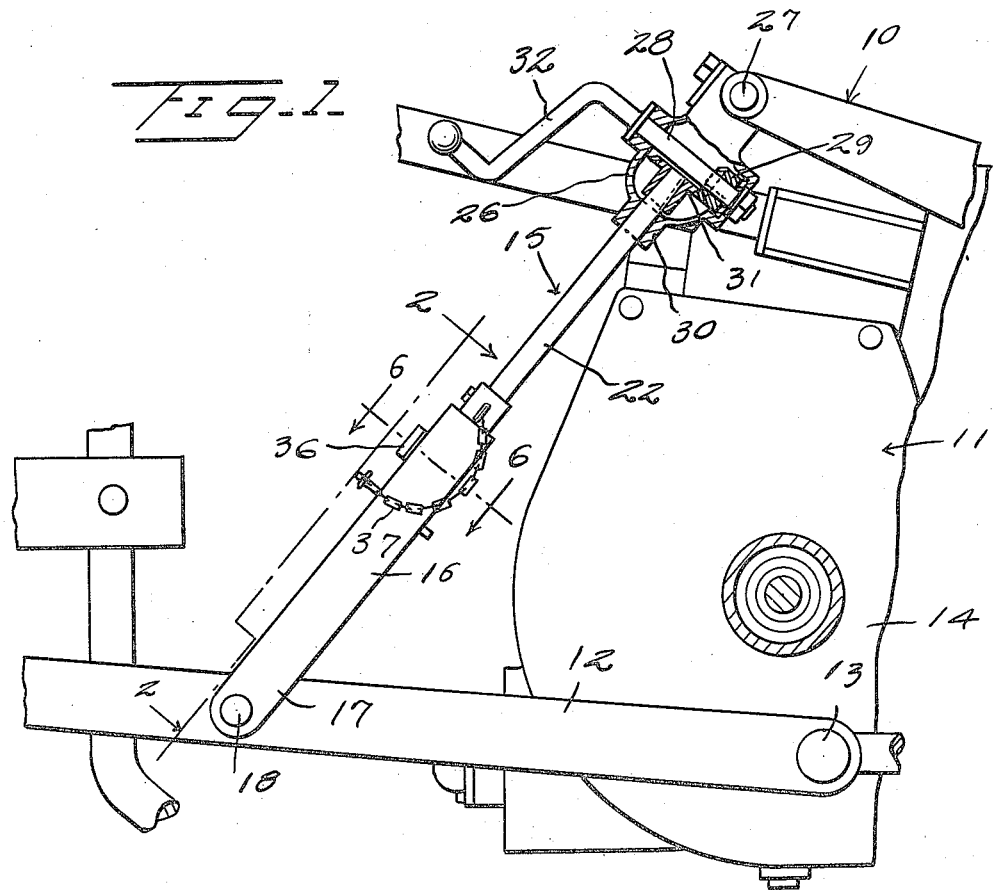
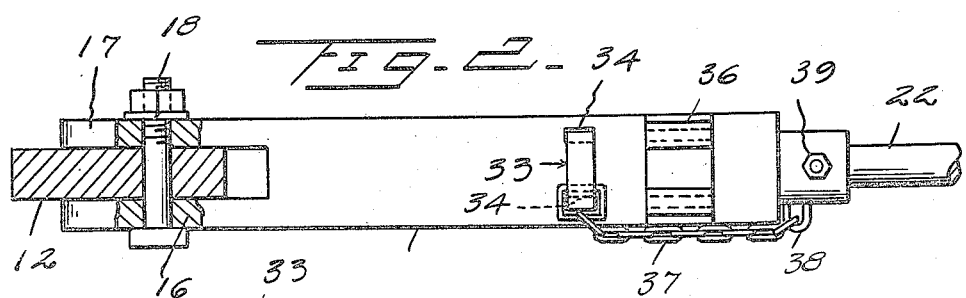
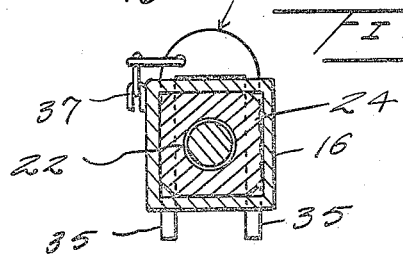
Inventor
O. R. Hennings
By Kimmel & Crowell
Attys.

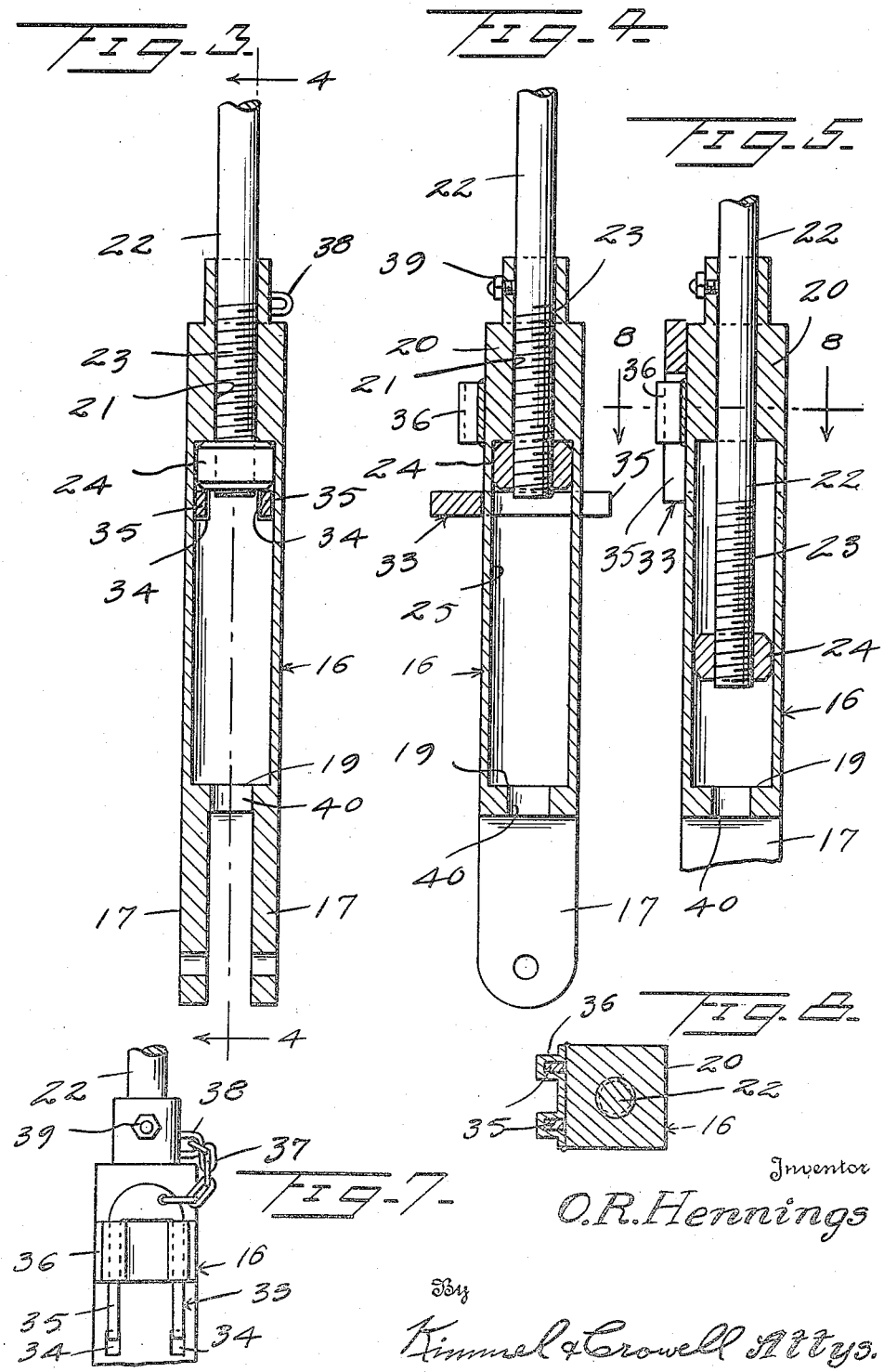

Patented Feb. 13, 1951

2,541,964

UNITED STATES PATENT OFFICE 2,541,964

FLEXIBLE SLIDE FORK

Orvylle R. Hennings, Gresham, Nebr.

Application December 22, 1947, Serial No. 793,140

3 Claims. (Cl. 74—586)

1

This invention relates to improvements in the lifting forks on tractors.

An object of this invention is to provide an improved lifting fork or link between the lift arm and the tension bar at the rear of a tractor so as to provide for vertical movement between the tractor and the implement.

Another object of this invention is to provide a lifting fork including a pair of extensible link members which are slidingly connected together and including means for selectively locking said members together in the adjusted positions of one member relative to the other.

A further object of this invention is to provide a lifting fork which includes a lower tubular member pivotally secured to the tension bar, an upper member adapted to be secured to the tractor lift arm, and a nut slidingly disposed in the lower member and threaded onto the upper member whereby rotation of said upper member will effect endwise adjustment of said members while at the same time said members may have relative endwise movement, the device also including means whereby the nut may be locked against sliding movement.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary side elevation, partly broken away and in section, of the rear portion of a tractor having a lifting fork constructed according to an embodiment of this invention mounted thereon.

Figure 2 is a fragmentary sectional view taken on the line 2—2 of Figure 1.

Figure 3 is a fragmentary longitudinal section of the lower portion of the lifting fork.

Figure 4 is a sectional view taken on the line 4—4 of Figure 3.

Figure 5 is a sectional view similar to Figure 4 but showing the upper link member in released and sliding position.

Figure 6 is a sectional view taken on the line 6—6 of Figure 1.

Figure 7 is a fragmentary plan view of the upper end of the lower member of the lifting fork.

Figure 8 is a sectional view taken on the line 8—8 of Figure 5.

2

Referring to the drawings, the numeral 10 designates generally a lifting lever or crank which is operatively connected with the lifting mechanism disposed at the rear of a tractor, generally designated as 11. The tractor 11 has extending rearwardly therefrom a tension or drawbar 12 which is pivotally mounted as at 13 at the lower portion of the differential housing 14. In order to provide a means whereby the angular position of the tension or drawbar 12 may be adjusted to provide for the desired connection with different types of farm implements, I have provided a slide fork, generally designated as 15, which is connected between the arm or lever 10 and the tension bar 12. The slide fork 15 includes a lower tubular link member 16 provided with a pair of ears 17 at the lower end the.eof engaging on opposite sides of the tension bar 12 and pivotally secured thereto by means of a pivot member 18.

The lower member 16 includes a lower end wall 19 and also includes an upper portion 20 which is formed with a bore 21. An upper link member 22 in the form of a round rod or shaft is slidably disposed in the bore 21 and is formed with threads 23 on which a nut 24 is threaded. The end wall 19 is formed with an aperture 40 so that the upper member 22 may be passed between the ears 17. The nut 24 comprises a slide member which is slidable in the bore 25 of the tubular member 16, the latter being polygonal in transverse section so that the nut 24 while freely slidable lengthwise of the tubular member 16 will be held against rotation. The upper member 22 extends into a gear housing 26 which is rockably mounted on a pivot 27 engaging the rock arm or lever 10. The housing 26 has extending thereinto a shaft 28 on which is mounted a spur gear 29. The link or shaft 22 which rotatably engages through a bushing 30 carried by the housing 26 has fixed thereon a beveled gear 31 meshing with the beveled gear 29. A crank 32 is fixed to and extends from the shaft 28 so that the shaft 28 may be manually rotated to thereby rotate link or shaft 22 and adjust the endwise position of nut 24 relative to shaft 22. Endwise adjustment of nut 24 will provide for either increasing or decreasing the length of the lifting fork 15. The nut 24 may be locked at the upper end of the lower member 16 by means of a U-shaped locking member 33. The tubular member 16 is provided with a pair of openings 34 through which the locking lugs 35 of the U-shaped member 33 are adapted to engage as shown in Figures 3 and 4.

The locking member 33 when in released position is adapted to be engaged by a pair of keeper members 36 which are fixed to the outer side of the upper member 20 of the tubular member 16. A chain or flexible member 37 is secured at one end to the locking member 33 and at the other end to an eye 38 which is fixed to the upper end of the lower member 16. The shaft or upper member 22 may be lubricated by means of a fitting 39 which is threaded through the upper end of the lower member 16. When the tractor 11 is moving over relatively uneven ground the locking member 33 is disposed within the holders or keepers 36 so that the nut 24 may have free sliding movement lengthwise of the lower member or guide 16.

In the use and operation of this slide fork the fork 15 is pivotally connected by means of pivots 18 and 28 to the tension bar 12 and the lifting arm 10, respectively. The angular position of tension bar 12 may be adjusted by turning crank 32 which will rotate threaded shaft or link member 22 so as to thereby increase or decrease the length of the lifting fork. If it is desired to lock the upper member 22 against movement relative to the lower member 16, the U-shaped locking member 33 is inserted through the openings 34 with the nut 24 in its uppermost position. However, when it is desired to provide for relative movement between the two link members 16 and 22, the locking member 33 is removed from the keeper openings 34 and inserted in the holders 36. With the nut 24 released this nut will normally engage the upper member 20 of the lower member 16 but when the tractor moves over relatively uneven ground so as to thereby relieve the tension bar 12 of the weight of the implement at the forward end of the latter, the lower member 16 may freely move upwardly, sliding over the nut 24.

I claim:

1. In a tractor having a lift arm and a tension bar, a lifting form connected between said arm and said bar, said fork including a lower tubular member having a polygonal configuration in transverse section, an upper elongated member slidably engaging through the upper end of said lower member and formed with a threaded lower end, a nut threaded on said upper member, non-rotatable and slidably engaging in said lower member, means on the upper end of said upper member for rotating said upper member to thereby vary the length of said fork, said lower member having a pair of openings therethrough, and a U-shaped locking member with the spaced sides thereof insertable through said openings engaging the underside of the nut for selectively locking said nut between the upper end of said lower member and said pin.

2. In a tractor having a lift arm and tension bar, a variable length fork including a lower tubular member having a polygonal bore, an upper elongated member slidably engaging through the upper end of said lower member and formed with a threaded lower end, a threaded member of limited linear length threaded on said upper member non-rotatable and slidable within said lower member, a bevelled gear on the upper end of said upper member, a housing rotatable about said upper member enclosing said gear, a gear shaft engaging through said housing perpendicular to said upper member, a bevelled gear on said shaft engaging said first bevelled gear, a crank on said shaft for rotating said upper member, and a removable locking pin engageable through openings in said lower member and in engagement with the bottom of said threaded member for securing said slidable threaded member between said pin and the upper end of said lower member thereby selectively locking said threaded member against sliding movement.

3. A variable length fork for use in a tractor having a lift arm and a tension bar, said fork including a lower tubular member having a polygonal bore, an upper elongated member slidably engaging through the upper end of said lower member and formed with a threaded lower end, a threaded member of limited linear length threaded on said upper member non-rotatable and slidable within said lower member, means operatively connected to said upper member to move the same, and a removable locking pin engageable through at least one opening in said lower member and in engagement with the bottom of said threaded member for securing said slidable threaded member between said pin and the upper end of said lower member thereby locking said threaded member against sliding movement.

ORVYLLE R. HENNINGS.

REFERENCES CITED

The following references are of record in the file of this patent:

UNITED STATES PATENTS

| Number | Name | Date |
| --- | --- | --- |
| 685,011 | Tell | Oct. 22, 1901 |
| 739,511 | Spencer | Sept. 22, 1903 |
| 842,770 | Connelly | Jan. 20, 1907 |
| 879,384 | Hillman | Feb. 18, 1908 |
| 2,104,745 | Howell | Jan. 11, 1938 |
| 2,274,895 | Haniquet | Mar. 3, 1942 |
| 2,347,921 | Miller | May 2, 1944 |
| 2,398,152 | Nash | Apr. 9, 1946 |
| 2,458,312 | Stephen | Jan. 4, 1949 |
| 2,465,734 | Lavin | Mar. 29, 1949 |